Nov. 7, 1933.　　　　G. R. LAMB　　　　1,934,132
FISHERMAN'S IMPLEMENT
Filed June 1, 1933　　　2 Sheets-Sheet 1
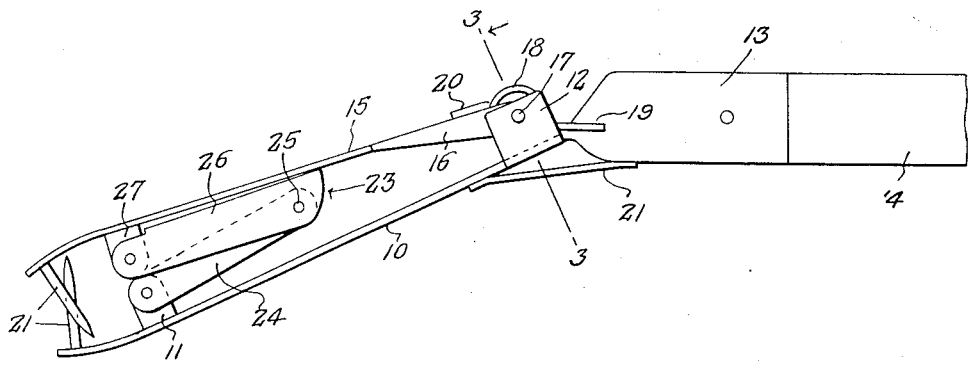
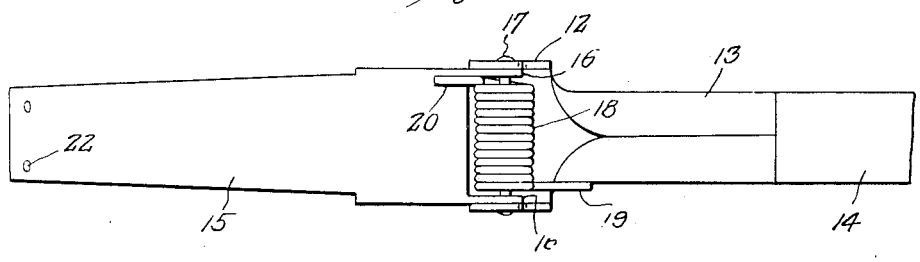
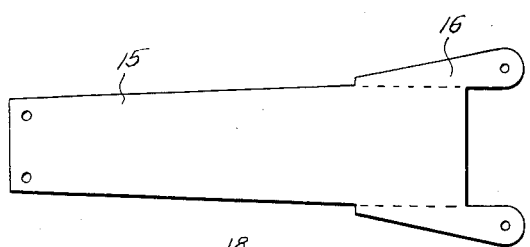
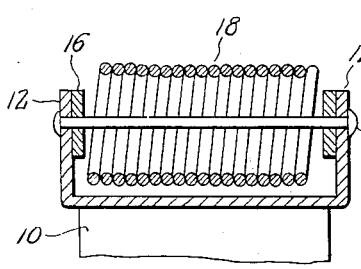
Inventor
Guy R. Lamb,
By Clarence A. O'Brien
Attorney Nov. 7, 1933.    G. R. LAMB    1,934,132
FISHERMAN'S IMPLEMENT
Filed June 1, 1933    2 Sheets-Sheet 2
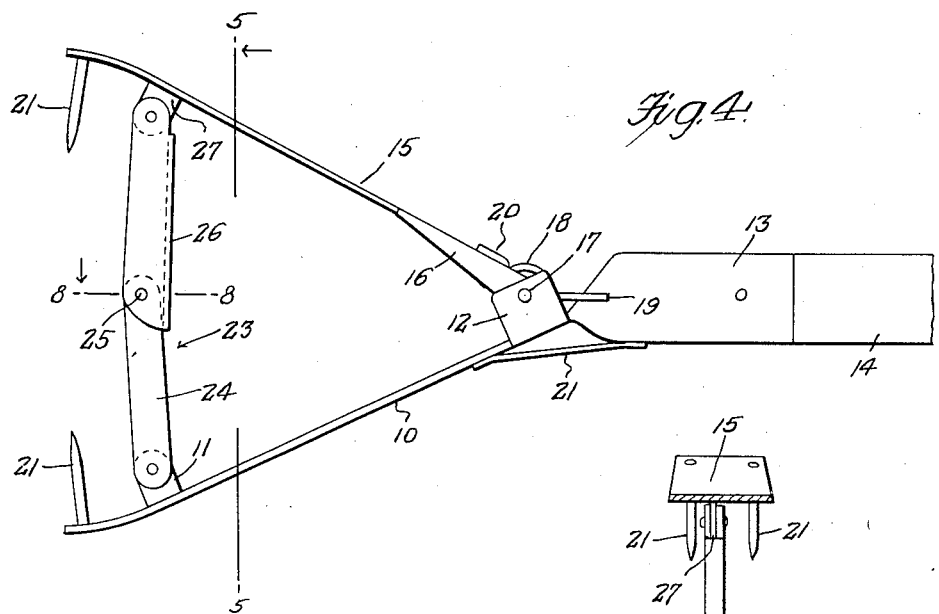
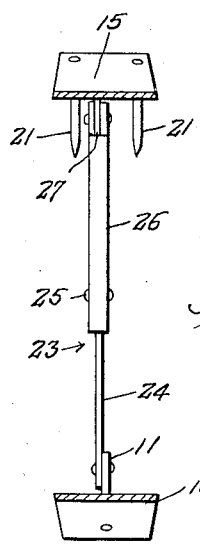
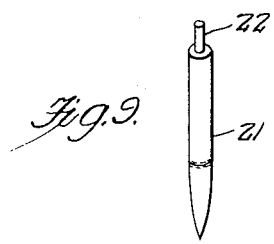
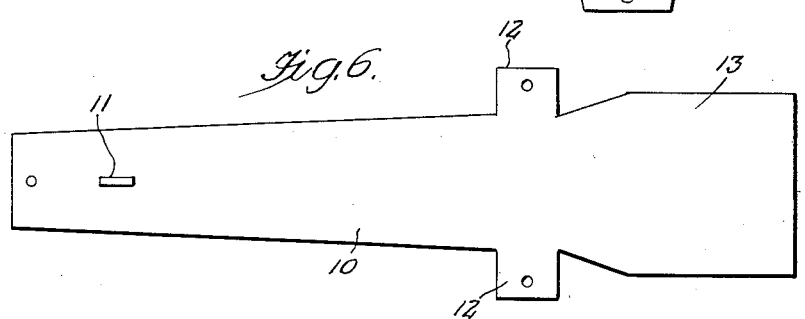
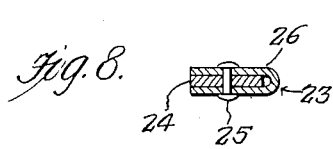
Inventor
Guy R. Lamb,
By Clarence A. O'Brien
Attorney Patented Nov. 7, 1933

1,934,132

UNITED STATES PATENT OFFICE 1,934,132

FISHERMAN'S IMPLEMENT

Guy R. Lamb, Marion, Ky.

Application June 1, 1933. Serial No. 673,899

2 Claims. (Cl. 43—5)

This invention relates to an improved tong-like implement, which is especially, but not necessarily, adapted for use by fishermen in snaring frogs, fish, crabs and the like to expedite holding and subsequent removal and disposal for food and preservation purposes.

Needless to say, large fish, crabs and similar species, are not always susceptible of being easily held while being removed from a line. Consequently, I have discovered the need for a supplementary device or implement, which will serve satisfactorily as a holder or grappling tool for the purpose.

In carrying the principles of the present inventive conception into actual practice through the production of a working device, I have evolved and produced a structure, whose features of accommodation and adaptation render it aptly fitted and satisfactorily usable for the purposes intended.

The aforesaid advantages are obtained through the adoption and use of a simple, economical and practicable selection and coordination of parts, characterized by a pair of companion toothed spring closed jaws, with a quick acting trip and tension means associated with the jaws, whereupon by engaging the trip means with an object, the jaws are snapped to closed position to embed the teeth in said object securely for maintenance purposes.

In the drawings:

Figure 1 is a side elevational view of the improved device or implement, constructed in accordance with the principles of my invention, and showing the jaws closed.

Figure 2 is a top plan view of the assemblage shown in Figure 1.

Figure 3 is a transverse sectional view taken approximately on the plane of the line 3—3 of Figure 1.

Figure 4 is a view like Figure 1, showing the jaws swung to open position.

Figure 5 is a sectional view taken on the plane of the line 5—5 of Figure 4.

Figure 6 is a plan view of the sheet material blank, from which the lower or stationary jaw is fashioned.

Figure 7 is a similar view of the sheet metal blank, utilized for constructing the upper or movable jaw.

Figure 8 is a detailed section on the line 8—8 of Figure 4, and

Figure 9 is a perspective detailed view of one of the penetrating teeth or spurs.

Attention is first invited to Figure 6, wherein it will be observed that the numeral 10 designates the lower, relatively fixed gripping jaw. This comprises a sheet metal blank of imperforated material, and of suitably longitudinally elongated configuration, having a centralized laterally extending ear or lug 11 at one end. Intermediate its ends and on opposite longitudinal edges, it is provided with apertured pivot ears 12. That portion 13 to the right of the ears 12 is shaped to permit it to be turned or rolled into a socket to accommodate an extension handle 14, as shown in Figures 1, 2 and 4. The ears 12 are of course bent into opposed parallelism to accommodate the relatively movable jaw 15.

The jaw 15, as shown in Figure 7, is formed at the right hand end with wing-like extensions 16, suitably apertured and bent at right angles and into parallelism to permit said wings to be disposed between and suitably attached to the ears 12, by an appropriate pivot bolt 17, as illustrated in Figure 3. The numeral 18 designates a coil spring located between the wings and ears, and surrounding the pivot bolt and having its end portion 19 and 20 located, as shown in Figure 2, when the structure is assembled to provide the requisite spring closing action for the movable jaw 15. Incidentally, the numeral 21 in Figures 1 and 4 designates a reinforcing brace for the lower jaw. Both jaws 10 and 15 are of corresponding shape and proportion, and are provided at their free, swingable ends with spurs or teeth. Each tooth is denoted by the numeral 21 in Figure 9, and is pointed at one end and provided with a reduced portion 22 at the opposite end, fitted into an accommodation aperture provided in the end portions of the jaw which carries it. In practice, it has been found that two teeth may well be attached to the movable jaw 15, and a single tooth attached centrally to the lower jaw 10, these three teeth being in a position to provide the requisite clamping or grappling action.

I next call attention to numeral 23 in Figures 1 and 4. This designates a unit which may be described as a double link trip and retention device. One link 24 is pivotally attached to the lug 11, this being a single bar member. At its opposite end, it is pivotally attached as at 25 to the channel shaped or sheath-like link 26, the latter link being in turn pivotally connected to a lug 27 on the movable jaw. When the jaws are spread apart and set for action, the two links are disposed in approximate longitudinal alinement, as shown in Figure 4, at which time, the pivotal connection 25 between said links passes beyond dead center and holds the jaws thus spread apart. Obviously, when an object strikes the pivotal connection 25, the joint between said links breaks allowing the trip device 23 to fold or retract into the relationship shown in Figure 1. This in turn, allows the movable jaw 15 to approach the fixed jaw 10 and permit the fish, crab or other object to be securely grabbed between the jaws by the teeth 21. As before stated, an extension handle 14 is utilized as a reach rod to permit the implement to be satisfactorily handled and forced against the object sought to be caught.

The structural features to be emphasized are these: First, novelty is thought to reside in the adoption of a sheet metal blank of the type illustrated in Figure 6, provided at one end with a single centralized fixedly mounted right angularly disposed tooth, intermediate its ends with apertured attaching ears for the movable jaw 15, and beyond these ears 12 with a shank portion 13, susceptible of being converted into a tubular socket to accomodate the reach rod or handle 13. In addition, it is to be observed that this unit of which I speak, is so formed as to dispose the jaw portion, that is, the portion carrying the tooth at an approximate obtuse angle to the axis of the tubular socket, a brace element 21 being employed to insure this fixed relation of parts.

Secondly, novelty is believed to be found in the cooperation with the special jaw 10, of the relatively movable pivoted jaw 15 constructed from the wing equipped blank shown in Figure 7, wherein the wings serve to stabilize the construction of said jaw and provide effective means for attaching it to the ears 12, through the instrumentality of a pivot rod 17. In connection with this pivotal joint, a simplified spring 18 of a renewable type is utilized, and satisfactorily arranged to provide the requisite clamp closing action of the jaw 15 when it is released from the open position, shown in Figure 4.

Third, novelty is thought to be predicated upon the sensitive device 23, of a foldable or collapsible type, which is sufficient in type and style to hold the jaws spread apart, when the implement is set for use, and to allow the jaws to come together with a snap action, as soon as said trip is released by engagement with a fish or similar object, against which the implement is forced.

I claim:—

1. An implement of the character described, comprising a handle forming reach rod, a ferrule attached to the outer end of said rod, a fixedly mounted jaw carried by said ferrule and extending at an approximate obtuse angle with respect to the longitudinal axis of the ferrule, a pointed tooth carried by the outer free end portion of the said jaw, a companion relatively movable jaw of a type corresponding to said first named jaw, said movable jaw being pivotally attached at its inner end to the corresponding portion of said fixed jaw at a point adjacent said ferrule, and spring means associated with the point of connection of said jaws for automatically closing the movable jaw, teeth carried by the outer free end portion of the movable jaw, and a trip means interposed between and connected with said jaws to hold the jaws expanded and to allow the jaws to contract in the manner described.

2. An implement of the character described, comprising a socket, an elongated reach rod attached to said socket and constituting a handle, a fixed jaw carried by said socket, a spring closed relatively movable jaw cooperating with said fixed jaw and pivotally attached at its inner end to the corresponding end of said fixed jaw, both of said jaws being provided at their outer ends with teeth and inwardly of said teeth with lugs, a sheath like link pivotally attached to one of the lugs, a complemental link pivotally attached to the remaining lug, both of said links being attached together by a pivot pin to permit said links to collapse in the manner as described.

GUY R. LAMB.